(No Model.)
C. H. CROSTHWAITE.
LOCK NUT.
No. 565,842. Patented Aug. 11, 1896.
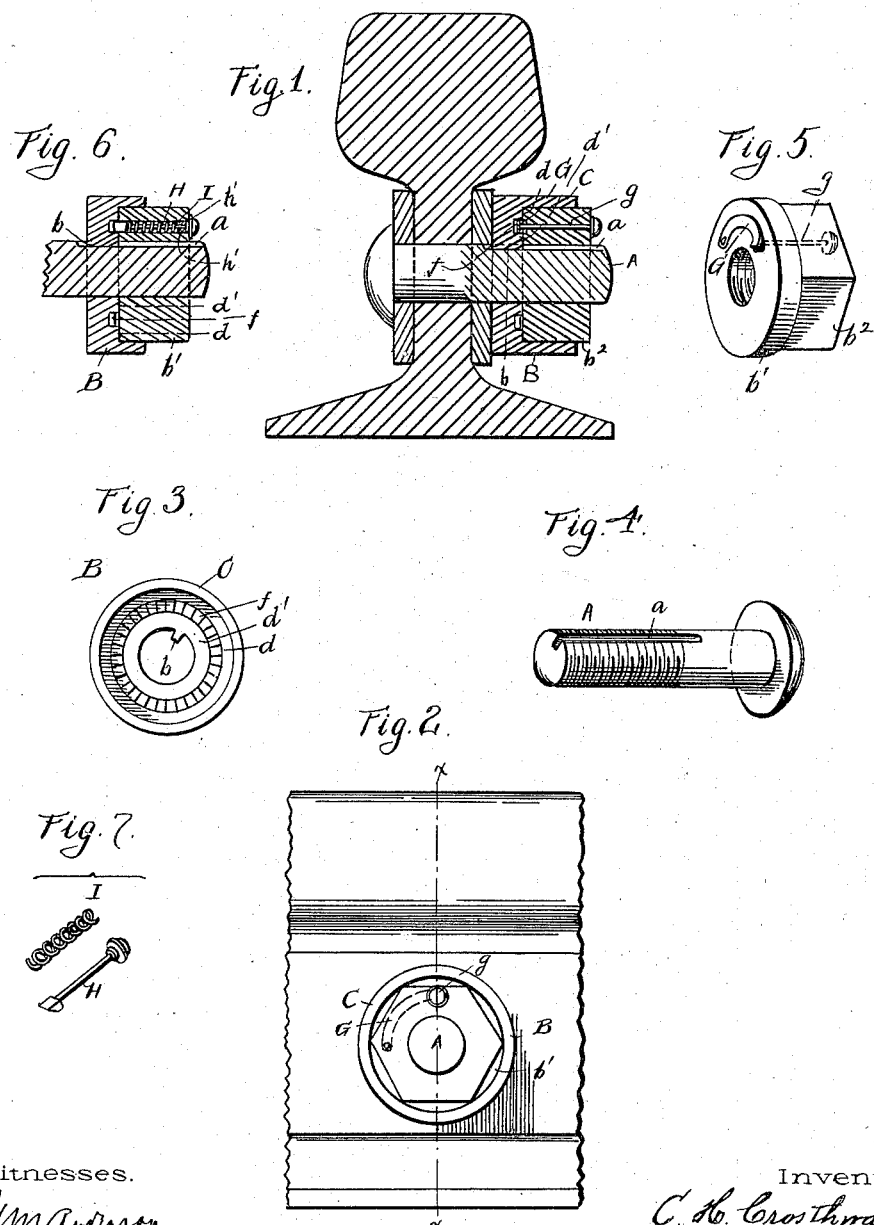
Witnesses.
Inventor.
C. H. Crosthwaite

UNITED STATES PATENT OFFICE.

CHARLES H. CROSTHWAITE, OF CANYON, COLORADO.

LOCK-NUT.

SPECIFICATION forming part of Letters Patent No. 565,842, dated August 11, 1896.

Application filed May 5, 1896. Serial No. 590,314. (No model.)

*To all whom it may concern:*

Be it known that I, CHARLES H. CROSTHWAITE, a citizen of the United States, and a resident of Canyon, in the county of Fremont and State of Colorado, have invented certain new and useful Improvements in Lock-Nuts; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a sectional view on the line $x\ x$, Fig. 2. Fig. 2 is a front view showing the invention applied to a rail-joint. Fig. 3 is a front view of the washer. Fig. 4 is a perspective view of the bolt. Fig. 5 is a perspective view of the nut. Fig. 6 is a detail sectional view of the washer, the nut, and a portion of the bolt in assembled positions, and showing a modified form of the locking device. Fig. 7 shows details of the pin H and the spring I.

This invention is designed to provide an improved lock-nut of simple and efficient character which is dust and water proof, and which is designed for use on bicycles, vehicles, agricultural implements, railroads, and wherever else it may be desirable to employ a nut of this character.

With these objects in view the invention consists in the novel construction and combination of parts, all as hereinafter described, and pointed out in the appended claim.

Referring to the accompanying drawings, the letter A designates the threaded end of the bolt, shaft, axle, or other device to which the nut may be applied, and which is formed with a longitudinal groove or keyway $a$.

B designates a washer, which is designed to seat either against a shoulder of the bolt or against the face of the part to which the bolt is applied. The said washer has an axial opening to receive the bolt and an internal key projection $b$, which is designed to engage the groove or keyway $a$ for the purpose of preventing it from turning upon the bolt. On its outer face the washer has a marginal flange or rim extension C, which forms a cylindric socket or cavity designed to seat the nut. This socket or cavity may be made sufficiently deep to entirely seat the nut, as seen in Fig. 1, or it may be shallow and seat only the inner or base portion thereof, as shown in Fig. 6. Formed in the bottom of the socket or cavity below the level of the angular surface or shoulder $d$, upon which the nut seats when screwed home, and a similar plain surface $d'$, which surrounds the central opening, and between these two surfaces is an annular series of ratchet-teeth or projections $f$.

The nut B has an inner or base portion $b'$, of circular form, which is turned to fit neatly the walls of the socket or cavity of the washer, and an upper portion $b^2$, fitted to form a wrench-seat.

G indicates a locking-device, which consists of a small bent spring-plate which is seated within a small cavity in the inner face of the nut and whose free ends form a dog which is arranged to engage with the ratchet-teeth $f$ upon backward rotation of the nut and thereby lock the same. Connected to this free end portion of the spring is a headed pin or stud $g$, which extends up through a small aperture in the nut, and by means of which the locking device may be retracted whenever it is desired to remove the nut.

In place of the locking device $g$, I may, however, use the device shown in Fig. 7, which consists of a pin or plunger H, which works loosely through an aperture in the nut and the points of which constitute a dog for engagement with the ratchet-teeth. The outer end of the pin or plunger is headed, and coiled around the pin between its dog and a bearing $h'$ near the outer end of the said aperture is a spring I. It will be noted that both the pins $g$ and H are formed with a flange at their heads for the purpose of closing the aperture through the nut in which the pin works to exclude the dust and water.

Owing to the neat manner in which the nut fits the washer and its neat contact with the bearing-surfaces $d'\ d'$, it will be observed that it will be almost impossible for dust or water to enter. The spring which engages the ratchet-teeth, being countersunk into the inside face of the nut, is rigidly supported on all sides and cannot break.

I prefer to make the spring and pin (or plunger) of one piece ending in a button outside the nut. This refers to the snap-spring only.

Having thus described my invention, what I claim as new, and desire to secure by Letters Patent, is—

The combination of a bolt having a longitudinal keyway formed therein, a washer fitting the same, and having a projection engaging the said keyway, said washer having on its outer face a marginal flange or rim extension in the plane of its lateral faces, and surrounding the nut-seat, the bottom of said seat having the concentric annular bearing-surfaces $d\ d'$ and the annular series of the ratchet-teeth formed between and below the plane of said surfaces, a nut having a circular base portion adapted to fit closely with the said seat, a spring-pressed dog carried by the said nut and adapted to engage the said ratchet-teeth, and a headed pin or shank attached to said dog and extending out through the nut, substantially as specified.

In testimony whereof I affix my signature in presence of two witnesses.

CHARLES H. CROSTHWAITE.

Witnesses:
E. E. VON GOHIUM,
A. G. AGARD.